April 7, 1936.    N. H. TAYLOR    2,036,443
METHOD OF AND APPARATUS FOR MEASURING THE RESISTANCE TO
DEFORMATION OF ASPHALT PAVING AND OTHER MATERIALS
Filed Sept. 25, 1933    2 Sheets-Sheet 1
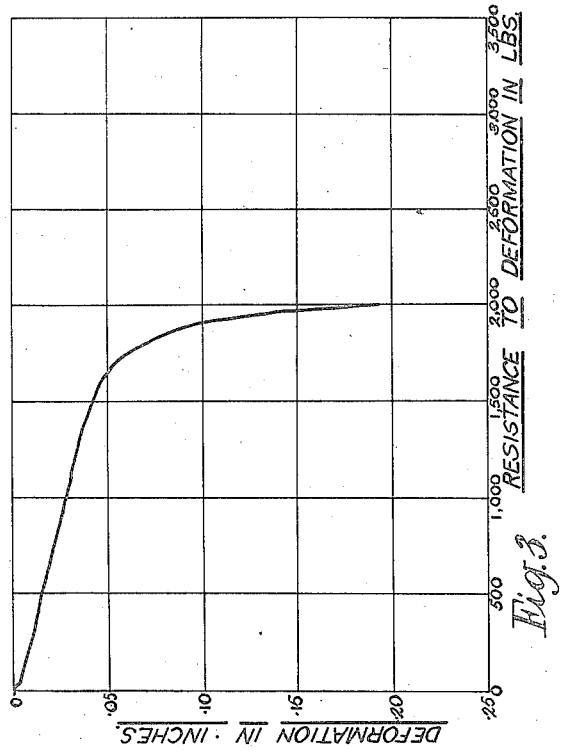
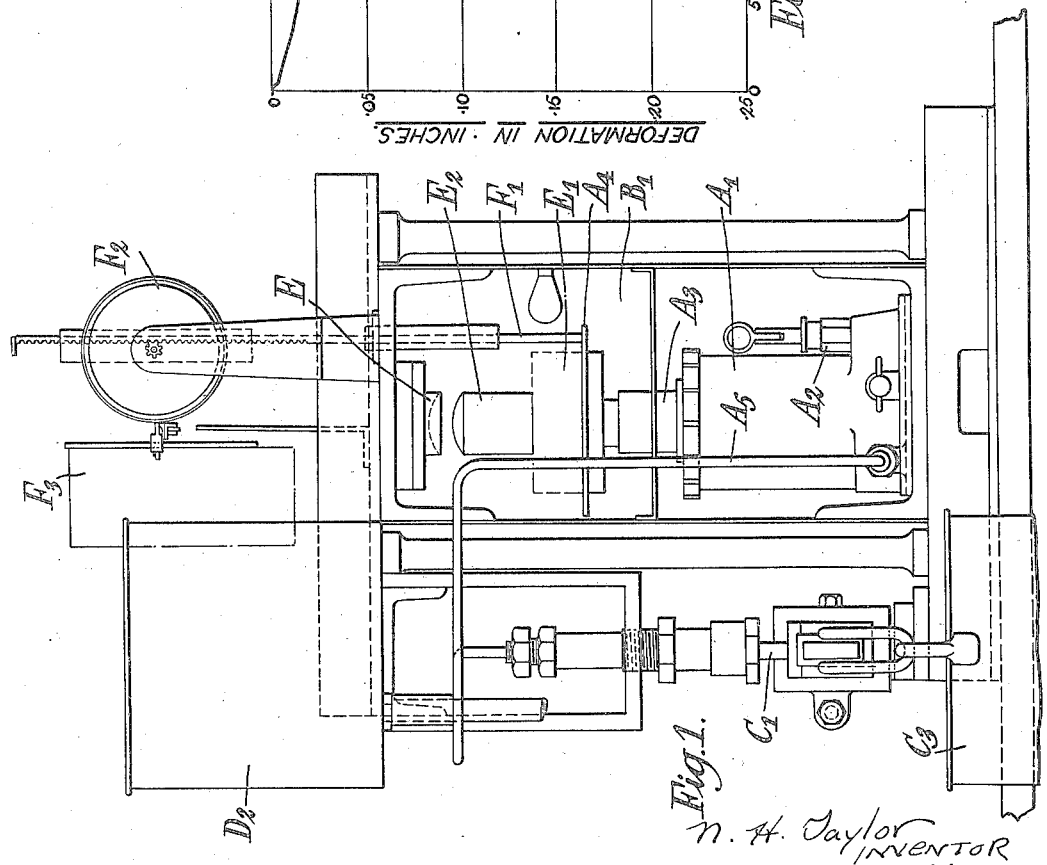
N. H. Taylor INVENTOR
By: Marks & Clerk ATTYS

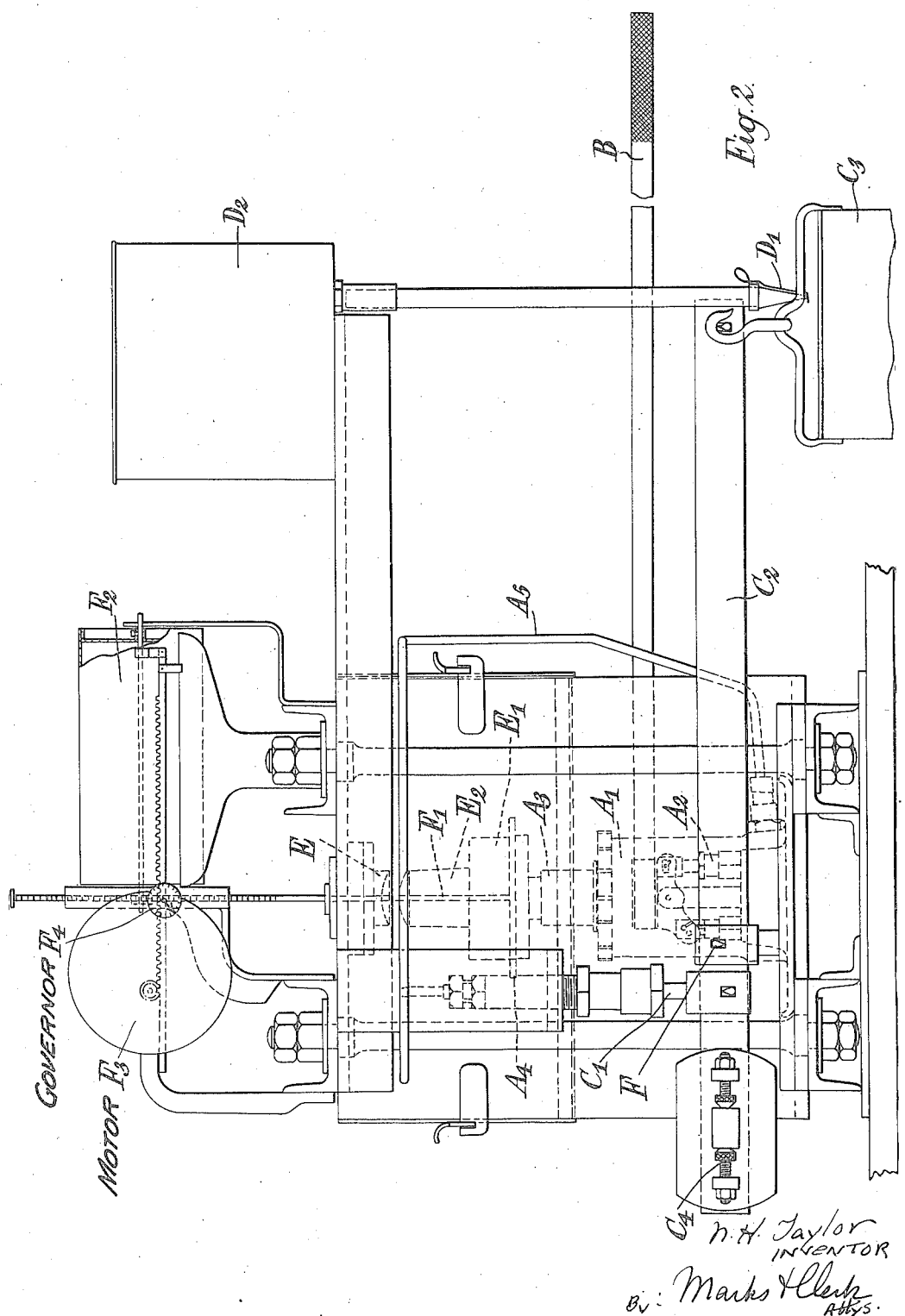

Patented Apr. 7, 1936

2,036,443

UNITED STATES PATENT OFFICE 2,036,443

METHOD OF AND APPARATUS FOR MEASURING THE RESISTANCE TO DEFORMATION OF ASPHALT PAVING AND OTHER MATERIALS

Norman Henry Taylor, Singapore, Straits Settlements

Application September 25, 1933, Serial No. 690,938
In Great Britain September 27, 1932

2 Claims. (Cl. 265—14)

This invention relates to a method of and apparatus for measuring the resistance to deformation of asphalt paving and other materials.

The resistance to deformation of asphalt paving materials varies with the viscosity of the bitumen in the mixture which in turn varies with the temperature. Since asphalt paving mixtures are plastic solids, the usual methods of compression or tensile testing fail when such tests are carried out at temperatures which are experienced on the roads during hot weather. Extrusion and shearing tests have been adapted to measure the resistance to deformation of asphalt paving mixtures, but such tests are not suitable for mixtures which contain stone.

The method according to the present invention consists in submitting a circular area in the center of a supported disc of the material at any predetermined temperature to a uniform rate of loading so that deformation of the cylinder of material beneath the loaded circular area occurs, which deformation is restrained by the annular portion of material not directly stressed until the outward movement of the central loaded portion creates a tension in the outer ring sufficient to rupture it, and measuring the load necessary to effect the said rupture.

A test piece in the form of a disc of the material under examination is thus compressed while hot to a density similar to that obtained when the mixture is laid on the road. The height of the disc is preferably at least twice that of the maximum dimension of the stone, if any, used in the mixture, and the diameter of the disc is preferably about three times the height.

The test approximates conditions which occur under traffic and the unit pressure at failure is proportional to the contact pressure of vehicles which would cause breaking down of the material under practical conditions. No further increase in density of the central core occurs during the compression test, on the contrary, the density of the loaded portion is invariably shown to decrease when tested after suffering plastic deformation. The result of the test is not affected by the mechanical stability of the stone aggregate. Although final failure is due to tensile stress this is caused by and is proportional to the plastic deformation of the central core.

The test is carried out at an elevated temperature which should approximate the maximum temperature experienced in the country in which the asphalt mixture is to be laid.

The invention also consists in apparatus for carrying the method into effect, comprising means for maintaining the desired temperature of the disc of material, means for applying a uniform rate of load to the circular area in the center of the disc, and means for indicating the load necessary to effect the rupture of the unloaded annular ring of material surrounding the central loaded material.

A suitable apparatus for carrying out the method according to the invention will now be described with reference to the accompanying drawings, in which:

Figures 1 and 2 represent a front and side elevation respectively of the apparatus, the former view showing the oven door removed.

In these Figures, $A_1$ represents a hydraulic jack which is actuated by a pump $A_2$ which in turn is operated by a handle B. The jack is provided with a plunger $A_3$ which projects through the base of an oven $B_1$ which may be heated by any convenient means, the plunger having a circular head $A_4$ which supports the test piece $E_1$.

Oil under pressure from the jack is conveyed through a pipe $A_5$ to the plunger $C_1$ which transmits pressure to the lever $C_2$ which is fulcrummed at F. The lever carries a container $C_3$ at one end, and is counter-balanced at the other end by a weight $C_4$. Sand or other material may be introduced at a constant rate into the container $C_3$ from the reservoir $D_2$ through the jet $D_1$.

When a test is to be carried out the test piece, which has been maintained at the required temperature for one hour prior to testing, is placed in the oven $B_1$, which is also at the required temperature, the test piece being placed centrally on the circular head $A_4$. The loose, cylindrical, spherical headed distance piece $E_2$ is placed centrally on the test piece and the plunger $A_3$ is raised by actuating the pump until the head of the distance piece is in contact with the concave faced pressure plate E which is concentric with the plunger of the jack and the test piece.

Any further movement of the head $A_4$ will be resisted by the distance piece and a load will be placed on the test piece while the pressure on the oil will be transmitted to plunger $C_1$ and will thus tend to cause the lever $C_2$ to move about the fulcrum F. If, however, the jet $D_1$ is now opened so that sand or other loading material enters the container $C_3$ the force transmitted through the plunger may be balanced and as the loading material continues to enter the container the increasing weight may be balanced by increasing the load on the test piece and thus the oil pressure on the plunger. If the lever is thus kept floating the uniform increase in weight in the container will ensure that a load is being applied at a uniform rate to the test piece.

Deformation of the test piece is recorded through the rod $F_1$ which is raised by the upward movement of the circular head $A_4$ and the rod in turn rotates, by means of a rack and pinion, the recording drum $F_2$. A pen in contact with the drum is drawn longitudinally across the drum at a constant rate by means of the clockwork or other motor $F_3$ of any well known type. The speed of the pen is controlled by the governor $F_4$ of any well known type and is adjusted so that the position of the pen with relation to the loads marked on the record card corresponds with the load on the test piece. Rupture of the annular ring of unloaded material is indicated by a rapid increase in deformation. The apparatus may be calibrated as follows. The rate of increase of the load on the test piece when the jet $D_1$ is open may be ascertained by multiplying the weight of material entering the container $C_3$ in a unit time by the mechanical advantage of the lever and hydraulic pressure system or may be ascertained directly by means of a dynamometer inserted in place of the test piece. If a record card be attached to the drum $F_2$ and the horizontal distance from a zero line be taken as representing the load on the test piece, then the speed of the pen may be adjusted by the governor $F_4$ so that the horizontal movement of the pen in a unit of time is equal to the increase in load on the test piece during that time. As illustrative if the rate of increase in load on the test piece be ascertained to be five hundred pounds per minute and a distance of one inch on the record card be taken as representing five hundred pounds, then the speed of the pen must be adjusted so as to move a horizontal distance of one inch per minute. If, with the pen in motion, the jet $D_1$ is opened as the pen crosses the zero line on the record card then the position of the pen at any moment will represent the load in pounds on the test piece.

Figure 3 represents a record of a test made as above described on a test piece of sheet asphalt which was moulded at a pressure of 5,000 lbs. per square inch, the testing temperature being 140° F. It will be noted that the resistance to deformation in this case reached 2,000 lbs.

It will be understood that the method may be carried out by means of apparatus other than that above described provided that means are employed which enable a uniform rate of loading to be obtained.

It will also be understood that the apparatus above described is equally applicable for testing any material other than asphalt paving where it is desirable to obtain a uniform rate of loading of a test piece, and at the same time an indication thereof.

Having now described my invention, what I claim as new and desire to secure by Letters Patent is:—

1. The method of measuring the resistance to deformation of asphalt paving and similar plastic materials, which consists in submitting a circular area in the centre of a supported and laterally unconfined disc of the material at any predetermined temperature, to a uniform rate of loading so that deformation of the cylinder of material beneath the loaded circular area occurs, which deformation is restrained by the annular portion of material not directly stressed until the outward movement of the central loaded portion creates a tension in the outer ring sufficient to rupture it, and measuring the load necessary to effect the said rupture.

2. An apparatus for measuring the resistance to deformation of asphalt paving and similar plastic materials, comprising a hydraulic pump, a hydraulic jack operated thereby, a heating chamber into which the plunger of the hydraulic jack projects, the said plunger being adapted to support thereon a disc of laterally unconfined material under test, an abutting member adapted to contact with a central circular area of the top of the disc, a conduit communicating with the pressure side of the pump, a second plunger operable by the fluid pressure within the said conduit, a lever, a receptacle at one end thereof, means for feeding thereto loading material at a uniform rate, the other end of the lever being engaged and counter-balanced by the said second plunger, the arrangement being such that when the hydraulic pump is operated at such a rate that the lever is kept floating, a uniform rate of loading of the disc is obtained, means whereby the upward movement of the plunger of the hydraulic jack in accordance with the deformation of the test piece is utilized to record said deformation on a card, co-operating with means whereby horizontal movement representing the uniformly increasing load is given to a recording pen movable over the card, whereby a progressive indication of the relation between the deformation of the test piece and the load is obtained.

NORMAN HENRY TAYLOR.